April 20, 1937.   J. ABRAHAM   2,077,375
APPARATUS FOR TESTING SPEEDOMETERS
Filed Sept. 4, 1936
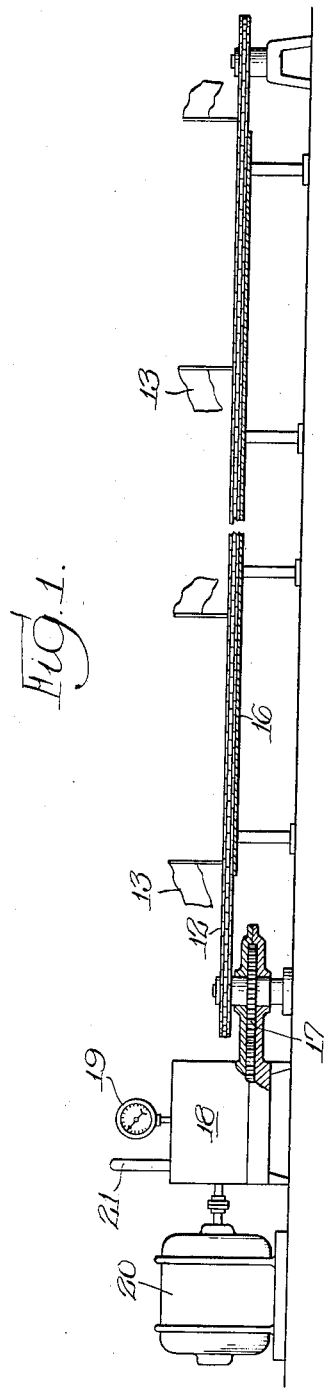
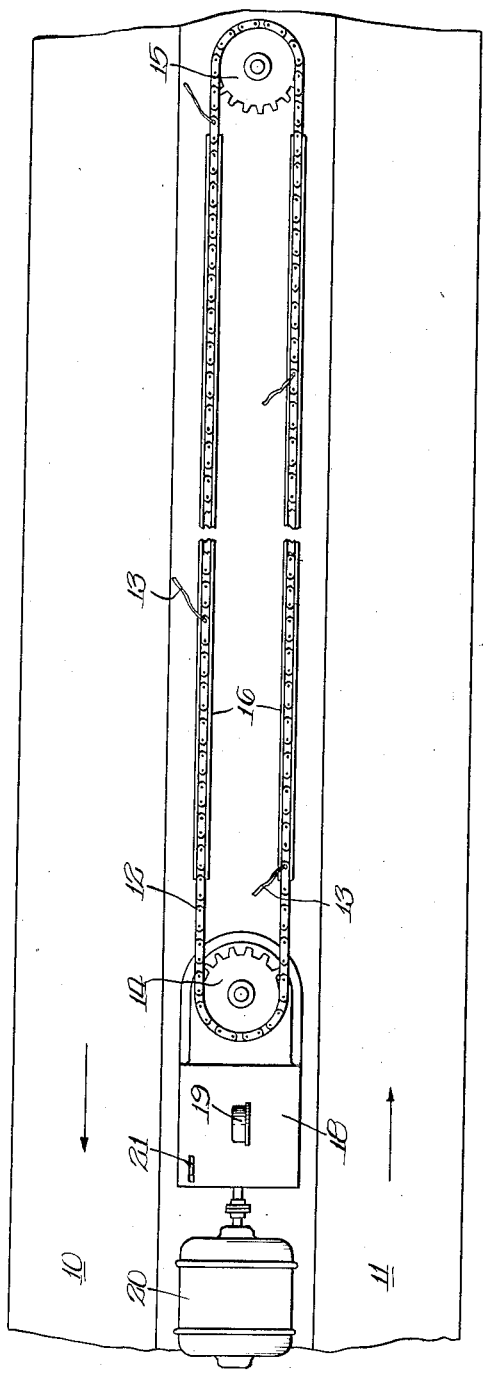
Inventor:—
Jeremiah Abraham,
By Murray & Murray Attys.

Patented Apr. 20, 1937

2,077,375

UNITED STATES PATENT OFFICE 2,077,375

APPARATUS FOR TESTING SPEEDOMETERS

Jeremiah Abraham, Elmhurst, Ill.

Application September 4, 1936, Serial No. 99,405

3 Claims. (Cl. 73—51)

My invention relates to means for testing the accuracy of the speed indicating devices used on automobiles.

A speedometer of this type is commonly tested only by removing it from the car and operating it on the bench in comparison with an instrument of known accuracy. This involves delay and expense, and, furthermore, is inaccurate and unreliable; this for the reason that the testing mechanism must be correlated to size of tires or wheels and degree of reduction between the wheels and the drive shaft from which the speedometer is commonly driven. Also the extent of inflation of the tires has a direct bearing on the speed that is indicated by the instrument.

I propose the use of simple mechanism by which the speedometer may be actually tested and an accurate result may be reached, all without removal of the instrument from the car.

One form of such apparatus is illustrated in the drawing, in which—

Fig. 1 is an elevation of apparatus constructed in accordance with my invention, and;

Fig. 2 is a plan view thereof.

In one embodiment of the invention, the apparatus is installed in a parkway or space intervening between two roadways 10—11 in which roadways the traffic moves in the directions indicated by the arrows. One form of the speed-indicating mechanism includes an endless chain or belt 12 having flags 13 or other markers secured thereto at spaced intervals. The chain is guided and supported between sprockets 14—15 by means of ways 16 preferably so arranged that only the flags project thereabove, thus shielding the chain from exposure in such manner that children might be injured thereby. It is assumed also that the sprockets and the operating mechanism will be suitably enclosed, such enclosures not being shown in the drawing. The sprocket 15 is an idler, while the sprocket 14 is driven through the gear 17 and other speed-reducing means contained within the box 18. A speed indicator 19 for checking purposes is connected to the operating mechanism. A synchronous motor 20 serves to operate the mechanism and to cause the chain and markers to travel at a predetermined speed. Conventional means that may be operated by the lever 21 may be supplied for selecting the speed.

It will be noted that the two sides of the chain and the flags travel in opposite directions and consequently that a motor car driven in either direction may check the accuracy of its speedometer. For use along-side of a roadway, it may be found desirable to shield the return markers and provide for checking in but one direction of travel.

In operation it is assumed that the apparatus will be installed in the described manner and will be of adequate length, say three-hundred feet, in order that the vehicle operator may have ample time within which to adjust the speed of his vehicle to that of the flags. Also that a sign will be provided announcing the speed at which the markers are traveling, this being accurately maintained by the use of a constant speed motor. For night use, I may provide electric lights in addition to the flags.

The form of apparatus may be changed in many of its elements and I do not wish to be limited, except as indicated in the appended claims.

1. In combination, an endless member guided for travel parallel to a stretch of roadway, markers mounted on said member in spaced relation, a synchronous motor and speed reducing means between the motor and the endless member, whereby a predetermined speed of travel of the markers may be maintained and whereby a car driver may, by conforming the speed of the car to that of a marker, compare the indication of his speedometer to the predetermined speed of the marker.

2. In combination, an endless member, means for guiding said member for horizontal travel parallel to a roadway, said member having markers thereon, a constant speed motor and gearing connecting the motor to the member whereby a predetermined speed of travel of the markers may be maintained.

3. In a speedometer testing device, the combination of an endless belt mounted for travel along an extended stretch of roadway, markers provided on said belt and means for causing uniform travel of said markers at a predetermined speed whereby a car containing a speedometer may be driven along side of said belt and its speed conformed to that of a marker and a comparison made between the indication of the car speedometer with the announced speed of the marker.

JEREMIAH ABRAHAM.